United States Patent [19]
Arimilli et al.

[11] Patent Number: 6,052,762
[45] Date of Patent: Apr. 18, 2000

[54] METHOD AND APPARATUS FOR REDUCING SYSTEM SNOOP LATENCY

[75] Inventors: Ravi Kumar Arimilli, Austin; John Michael Kaiser; Warren Edward Maule, both of Cedar Park, all of Tex.

[73] Assignee: International Business Machines Corp., Armonk, N.Y.

[21] Appl. No.: 08/755,877

[22] Filed: Dec. 2, 1996

[51] Int. Cl.[7] .................................................. G06F 12/08
[52] U.S. Cl. ............................................ 711/146; 395/308
[58] Field of Search ..................................... 711/146, 144; 395/308, 309, 306, 855, 856

[56] References Cited

U.S. PATENT DOCUMENTS

| | | |
|---|---|---|
| 5,025,365 | 6/1991 | Mathur et al. . |
| 5,175,833 | 12/1992 | Yarkoni et al. . |
| 5,325,503 | 6/1994 | Stevens et al. . |
| 5,339,399 | 8/1994 | Lee et al. . |
| 5,345,576 | 9/1994 | Lee et al. . |
| 5,355,467 | 10/1994 | MacWilliams et al. . |
| 5,377,345 | 12/1994 | Chang et al. . |
| 5,398,325 | 3/1995 | Chang et al. . |
| 5,446,863 | 8/1995 | Stevens et al. . |
| 5,448,742 | 9/1995 | Bhattacharya . |
| 5,623,632 | 4/1997 | Liu et al. ................................. 711/144 |
| 5,659,708 | 8/1997 | Arimilli et al. ........................... 711/146 |
| 5,673,414 | 9/1997 | Amini et al. ............................. 711/146 |

FOREIGN PATENT DOCUMENTS 0-432-524-A2  6/1991  European Pat. Off. .
5-100952      4/1993  Japan .
WO/90/00283   1/1990  WIPO .

OTHER PUBLICATIONS

TDB, "DEMI Cache Management Policy for a Coherent DMA Cache on a Snooping Memory Bus", vol. 37, No. 06A, Jun. 1994, pp. 241–242.

TDB ,"Initialization of I/O Subsystems According to Cache Technique", vol. 37, No. 02B, Feb. 1994, pp. 365–366.

TDB, "Arbitration for a PowerPC CPU Bus/PCI Bus System", vol. 38, No. 05, May 1995, pp. 411–412.

TDB, "Improved Cache Performance for Personal Computers", vol. 37, No. 11, Nov. 1994, pp. 279–281.

TDB, "Two Ported Memory Controller for High Speed CPUs", vol. 36, No. 10, Oct. 1993, p. 135.

Primary Examiner—Glenn A. Auve
Attorney, Agent, or Firm—Richard A. Henkler

[57] ABSTRACT

In multi-processor systems which have separated the system bus from the I/O bus, a Shadow Directory is introduced into the memory controller for reducing bottlenecks that occur from the processors snooping data cache in the I/O devices residing on the I/O bus. This Shadow Directory is advantageously employed in a system, such as the PowerPc architecture which distinguishes between the types of data that can be cached in I/O devices. The Shadow Directory uses two First In First Out (FIFO) stacks for two different types of data. These FIFO stacks are then used for addresses placed on the system bus and I/O bus in order to reduce snoop latency times.

15 Claims, 4 Drawing Sheets

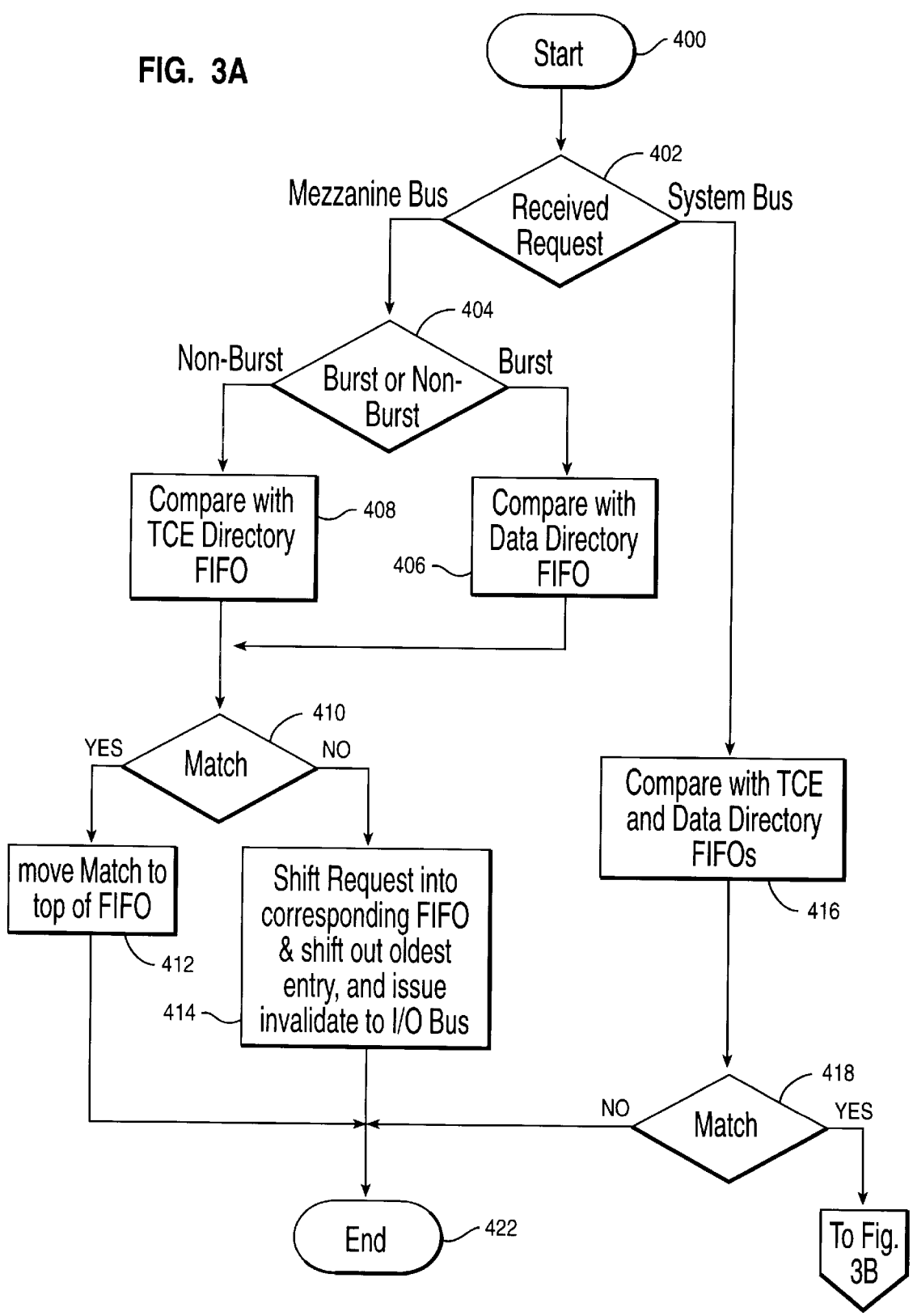

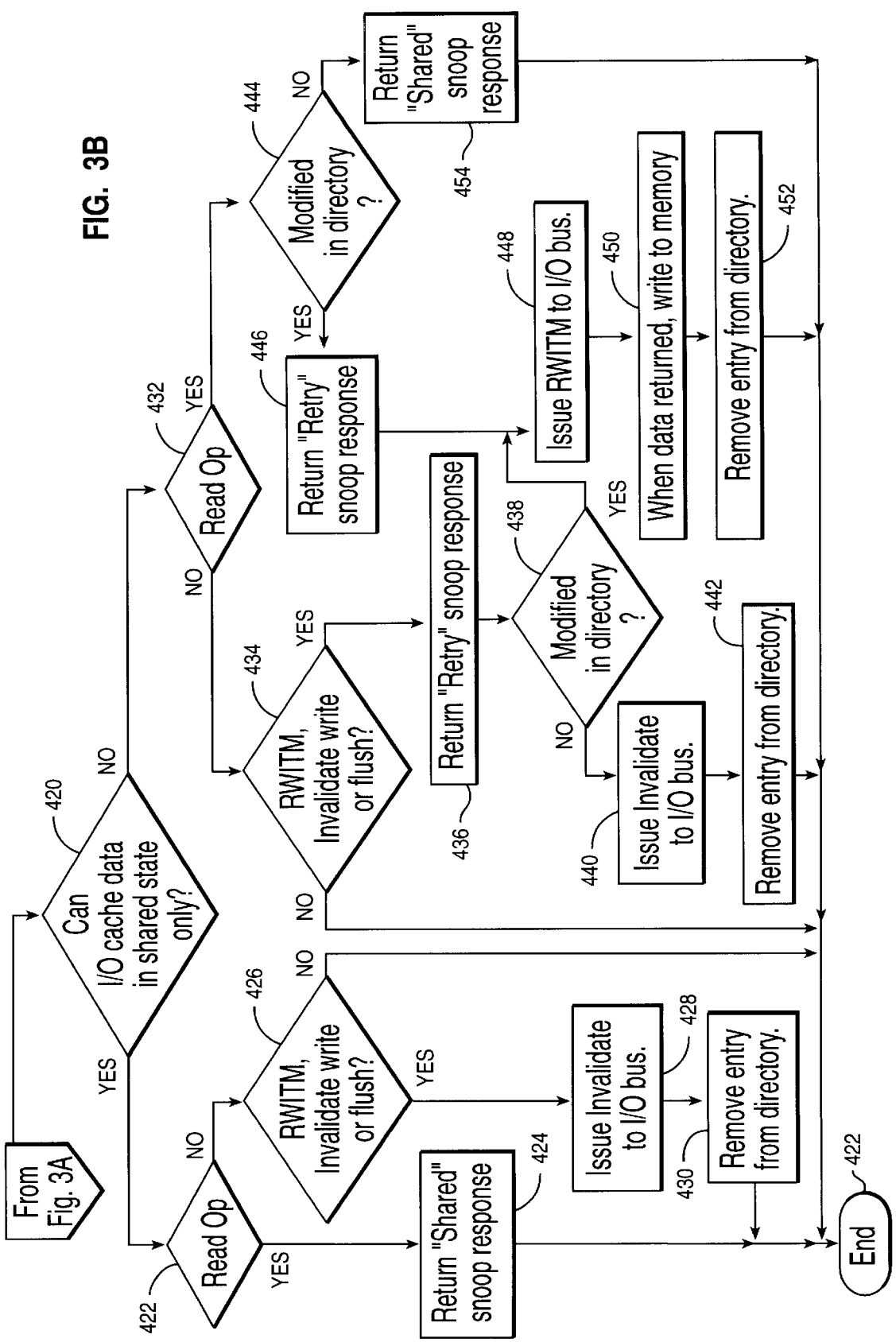

METHOD AND APPARATUS FOR REDUCING SYSTEM SNOOP LATENCY

BACKGROUND

1. Field of the Present Invention

The present invention generally relates to data processing systems, and more specifically, to methods and apparatuses in the systems that reduce system latency.

2. History of Related Art

The evolution of the computer industry has been driven by the insatiable appetite of the consumer for ever increased speed and functionality. One species that the evolution has created is the multi-processor computer.

Multi-processor systems, in similarity to other computer systems, have many different areas that are ripe for improvement. One such area ripe for improvement results from the current design implementations for multi-processor systems. Specifically, these multi-processor systems have a number of bottlenecks that degrade their overall performance. For instance, those; and skilled in the art are well aware of the difficulty of increasing processor performance due to the inability to keep the processors and their respective caches supplied with instructions and/or data.

A major performance factor is the speed of the bus which attaches the main memory to the processors. A secondary affect is the I/O bandwidth that the system supports.

Reference now being made to FIG. 1 (Prior Art), a schematic diagram of a typical multi-processor computer system 100 is shown. The computer system 100 includes two processors 102 and 104, memory 105, memory controller 106, and Bus Unit Controllers (BUC) 108 and 110. Communication between the processors 102 and 104, and memory controller 106 is facilitated by the system bus 112. The memory controller 106 is coupled to the memory 105, and communicates with BUCs 108 and 110, and processors 102 and 104 via Mezzanine bus (e.g. PCI bus) 116 and System Bus 112, respectively. Each of the BUCs 108 and 100 include caches 108a and 110a, respectively, and are used for communicating with I/O subsystems.

The design of system 100 reduces the loading effect on the system bus 112 by only placing the processors 102, 104, and memory controller 106 thereon; while the BUCs 108 and 110 are located on the Mezzanine bus 116. This type of configuration also allows for a higher frequency design and a wider data configuration (i.e. increases the bandwidth from processors 102 and 104 to memory 105) than would be practical with a design where all devices were on the system bus 112.

The separate Mezzanine bus 116 used for communication between the memory controller 106 and the I/O subsystem (s) provides several advantages. For example, the flexibility of the system 100 for multiple and different types of I/O buses is increased. In yet a further example, if the I/O bus was to be issued directly from the memory controller 106, then the limit on the system 100 would be based on the number of I/O buses which could be integrated into the memory controller 106 (i.e. both a pin count and a silicon space issue for the design of the memory controller).

The configuration of system 100 also results in the total bandwidth of the I/O subsystem only being dependent on the data width and the frequency of the I/O Mezzanine bus 116, and therefore, not limited by the bandwidth of any individual I/O bus.

Unfortunately, the design of system 100 results in a problem where the number of cycles required to snoop cached data in the BUCs (108 and 110) from an address placed on the system bus 112 to snoop response back to the system bus 112 is relatively long; especially when compared to the number of cycles required by one of the processors 102 or 104 to snoop its associated caches. In fact, this time may even be longer than it takes to read the requested data from the memory 105 itself. Further, if all addresses were required to be snooped down to the Mezzanine bus 116, then the system 100 configuration would not achieve any increased performance over a system using a combined system and Mezzanine bus.

It would therefore be a distinct advantage to have a method and apparatus that would allow the data processing snoop latency to be substantially equal to that of the processor snoop latency. The present invention provides such a method and apparatus.

SUMMARY OF THE PRESENT INVENTION

In one aspect, the present invention is an apparatus operating in a data processing system having a system bus, a memory controller, and an Input/Output (I/O) bus including at least one I/O cache. The processor is coupled to the system bus which is coupled to the memory controller, which in turn is coupled to the memory and the I/O bus. The apparatus is for reducing the time required to snoop address request for data residing in the at least one I/O cache.

The apparatus includes means for storing, in the memory controller, data related to address requests received from the I/O bus. The apparatus further includes means for retrieving the stored data in response to detecting an address request from the system bus. The apparatus also includes means for returning either a snoop response to the system bus, based on the retrieved data, or for changing the state of the retrieved data in the at least one I/O cache.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIGS. 3A–B are a flowchart illustrating the method for maintaining the Shadow Directory of FIG. 2 according to the teachings of the present invention.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the relevant art that the present invention can be practiced without such specific details.

In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
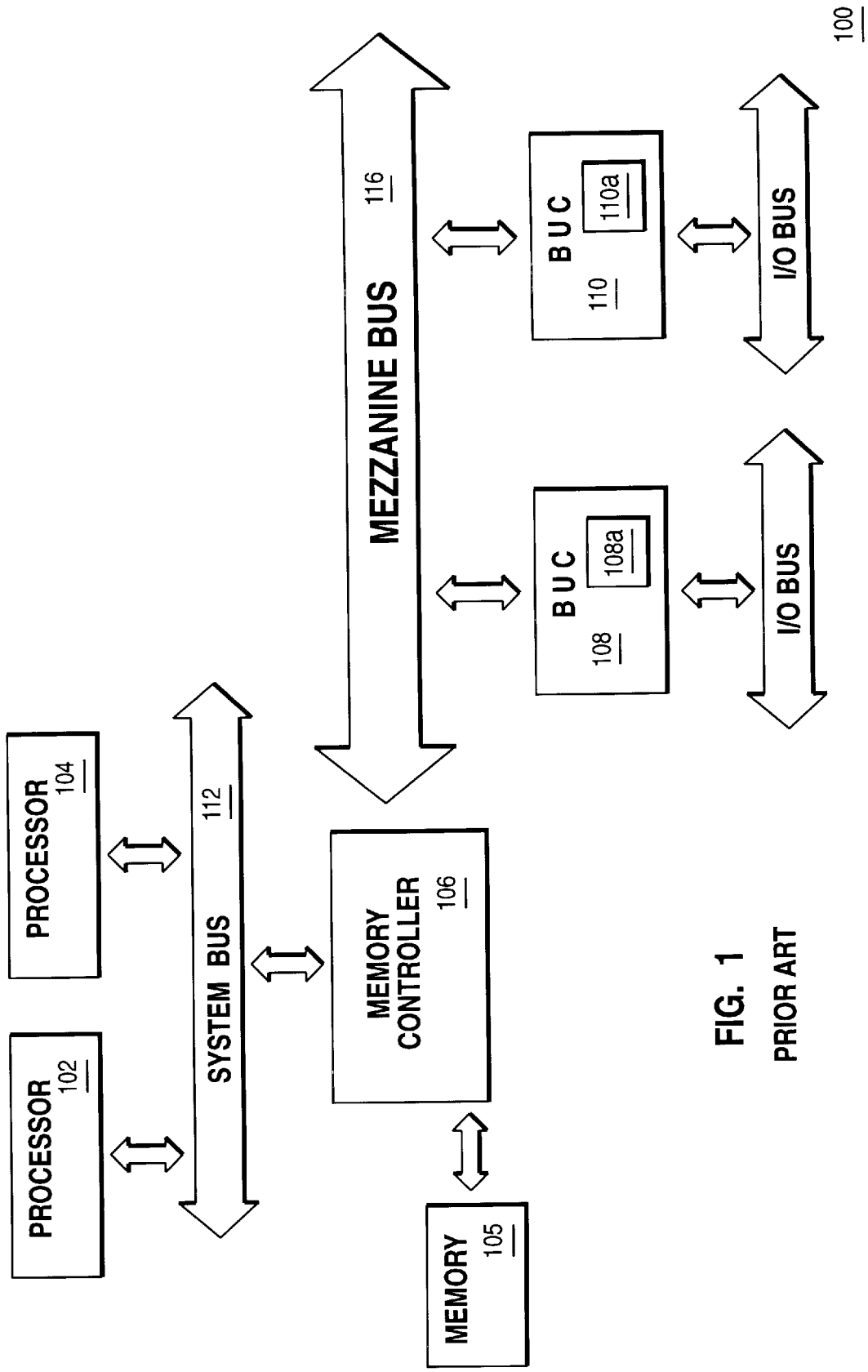
FIG. 1 (Prior Art) is a schematic diagram of a typical multi-processor computer system.
Figure 2:
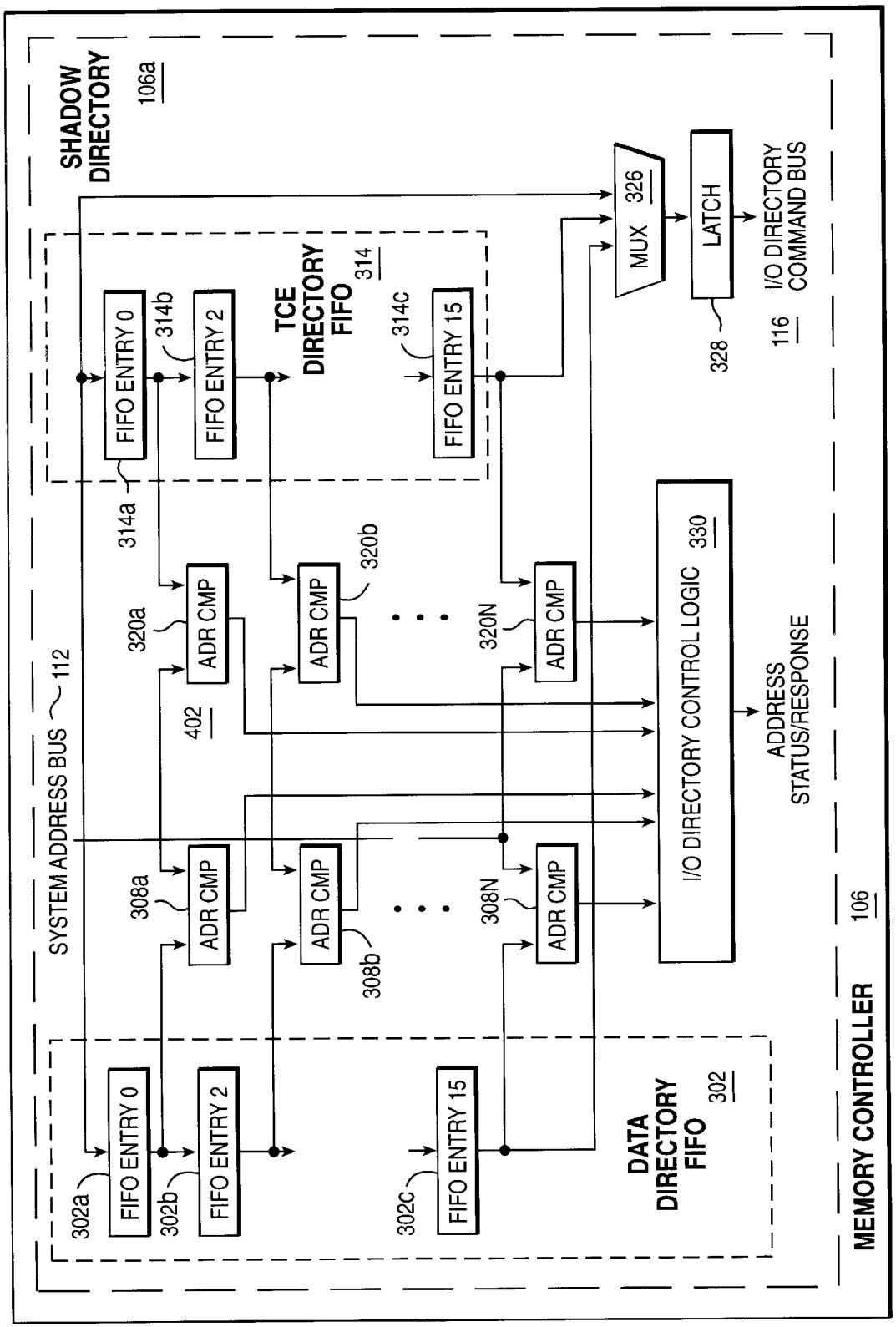
FIG. 2 is a schematic diagram illustrating a Shadow Directory that can reside in the memory controller of FIG. 1 in accordance with the teachings of the present invention.

Reference now being made to FIG. 2, a schematic diagram is shown illustrating a Shadow Directory 106a that can reside in the memory controller 106 of FIG. 1 in accordance with the teachings of the present invention. The Shadow directory 106a includes a Data Directory FIFO 302 (for tracking Burst reads for I/O), a Translation Control Entity (TCE) Directory FIFO 314 (for tracking non-burst reads from I/O), comparator logic 308a–n and 320a–n, a multiplexer 326, a latch 328, and I/O Directory Control Logic 330. Each of the above components and their related function are described hereinafter.

In general, the Shadow Directory 106a is responsible for tracking all of the addresses which are cached by the BUC Caches 108 and 110a. In the preferred embodiment of the present invention, the data processing system in which the Shadow Directory 106a is embedded is an RS/6000™ data processing server produced by International Business Machines, using one or more PowerPc™ microprocessors (e.g. 601, 604, or their successors). Although the following discussion is made in reference to the PowerPc architecture, this is not to be considered a limitation as to the applicability of the present invention to equivalent and non-equivalent architectures alike.

The PowerPc I/O architecture defines two types of data that can be cached in I/O devices (e.g. caches 110a and 108a). The first type is general purpose read/write data being issued to or received from a device on the Mezzanine bus 116. The second type is data associated with the address translation from the I/O generated address and the actual system memory 105 address.

Due to the inherent differences of usage, these two types of data are tracked differently from one another by the Shadow Directory 106a. More specifically, the general purpose read/write data is tracked on a page basis. In other words, there is one entry in the Shadow Directory 106a for each page accessed even though there may be more than one coherency block of data from that page cached in caches 108a or 110a. The translation data is tracked by the Shadow Directory 106a at the coherency block level.

These differences in tracking are designed to take advantage of these differences in usage. Specifically, Read/Write data is generally transferred in blocks of pages, and in most cases there will only be one I/O device at any given time asking for data from an individual page. Translation data is not organized as pages, and therefore, there could be many translation entries in any given page. Consequently, if the Shadow Directory 106a were designed as a single directory, then either the read/write data would overwhelm the directory with entries and flush out all of the translation entries, or every time a translation entry needed to be flushed, it would flush a large number of additional translation entries.

As shown in FIG. 2, the Shadow Directory 116 is split (i.e. the Data Directory FIFO 302 and Translation Directory FIFO 314). To support this design, all access to translation data must be issued with non-burst transfer requests, and all read/write data requests on the Mezzanine bus 116 must be issued as burst transactions.

In general, the Shadow Directory 106a is a First In First Out stack (FIFO) that contains the addresses of either the data pages or the translation cache lines that reside in caches 108a and 110a. Entries are made in the Shadow Directory 106a when I/O requests are received. Entries are removed from the Shadow Directory 106a when either there is a coherency conflict between the system bus 112 and the Mezzanine bus 116, or the Shadow Directory 106a is full and a new entry is required.

Whenever entries are removed from the Shadow Directory 106a coherency operations are issued to the Mezzanine bus 116 to clear the data from caches 108a and 110a. It should be noted from the above, that the nature of the Shadow Directory 106a results in caches 108a and 110a having different information from that of the Shadow Directory 106a. This results from the non-existence of a protocol to remove an entry, that one of the caches 108a or 110a has discarded, from the Shadow Directory 106a. As a result thereof, there may be entries in the Shadow Directory 106a when there is no matching data cached in caches 108a and 106a. In these cases, when the entry is pushed out of the Shadow Directory 106a, the coherency operations to the Mezzanine bus 116 are ignored by caches 108a and 110a.

The function and operation of the Shadow Directory 106a is explained in greater detail hereinafter in conjunction with FIGS. 3A–B.

Reference now being made to FIGS. 3A–B, a flowchart is shown illustrating the method for maintaining the Shadow Directory 106a of FIG. 2 according to the teachings of the present invention. The method begins at step 400 and proceeds to step 402 where an address request is received by the Shadow Directory 106a. If the received request is from the system bus 112, then the method proceeds to step 416. If, however, the received request is from the Mezzanine bus 116, then the method proceeds to step 404.

At step 404, it is determined whether or not the request for address data is of the burst or non-burst type. If, at step 404, it is determined that the request is of the burst type (i.e. read/write data), then the method proceeds to step 406. If, however, at step 404, it is determined that the request is of the non-burst type (i.e. translation data), then the method proceeds to step 408.

At step 406, the request is compared with the entries 302a–n of the Data Directory FIFO 302 via the address comparators 308a–n, respectively to determine whether or not a matching entry 302a–n exist. Thereafter, the method proceeds to step 410.

At step 408, the request is compared with the entries 314a–n of the TCE Directory FIFO 314 via address comparators 328a–n, respectively to determine whether not a matching entry 314a–n exist therein. Thereafter, the method proceeds to step 410.

At step 410, it is determined whether or not a match has been found within the Data Directory FIFO 302 or the TCE Directory FIFO 314. If, at step 410, it is determined that a match exist, then the match is moved to the top of the respective FIFO 302 or 314. Thereafter, the method proceeds to end at step 422.

If, however, at step 410, a match is not found, then the method proceeds to step 414. At step 414, the received request is shifted into the corresponding FIFO 302 or 314, and the last entry residing therein, if valid, is shifted out the bottom. This action results in a coherency operation (invalidate) to the Mezzanine bus 116 to clear the entry out of the cache 108a or 110a.

At step 416, the received request from the system bus 112 is compared with the entries 302a–n and 314a–n of the Data Directory FIFO 302 and the TCE Directory FIFO 314, respectively (via comparators 308a–n and 320a–n) for a matching entry. Thereafter, the method proceeds to step 418. If, at step 418, a match is found, then the method proceeds to step 420 (FIG. 3B). If, however, at step 418, no match is found, then the method proceeds to end at step 422.

Reference now being made to FIG. 3B, at step 420, it is determined whether or not the I/O Cache 108*a* or 110*a* can contain only shared data. If, at step 420, it is determined that the I/O Cache 108*a* or 110*a* can contain only shared data, then the method proceeds to step 422. If, however, at step 420, it is determined that the I/O Cache 108*a* or 110*a* can also modify data, then the method proceeds to step 432.

At step 422, it is determined whether or not the received request was a read operation. If, at step 422, it is determined that the received request is a read operation, then the method proceeds to step 424. If, however, at step 422, it is determined that the request is not a read operation, then the method proceeds to step 426.

At step 424 a shared snoop response is returned on the system bus 112, and the method proceeds to end at step 422.

At step 426, it is determined whether or not the request is a Read With Intent To Modify (RWITM), invalidate, write, or flush. If, at step 426, it is determined that the request is a RWITM, invalidate, write, or flush, then the method proceeds to step 428. If, however, at step 426, it is determined that the request is not a RWITM, invalidate, write, or flush, then the method proceeds to end at step 422. At step 428, an invalidate command is issued to the I/O bus (Mezzanine Bus 116), and the method proceeds to step 430. At step 430, the matching entry is removed from the corresponding directory 302 or 314. Thereafter, the method proceeds to end at step 422.

At step 432, it is determined whether or not the request is read operation. If, at step 432, it is determined that the request is a read operation, then the method proceeds to step 444. If, however, at step 432, it is determined that the request is not a read operation, then the method proceeds to step 434.

At step 434, it is determined whether or not the request is a Read With Intent To Modify (RWITM), invalidate, write, or flush. If, at step 434, it is determined that the request is a RWITM, invalidate, write, or flush, then the method proceeds to step 436. If, however, at step 434, it is determined that the request is not a RWITM, invalidate, write, or flush, then the method proceeds to end at step 422.

At step 436, a retry snoop response is returned, and the method proceeds to step 438. At step 438, it is determined whether or not the matching entry was modified in the corresponding directory 302 or 314. If, at step 438, it is determined that the matching entry was modified, then the method proceeds to step 448. If, however, at step 438, it is determined that the matching entry was not modified, then the method proceeds to step 440. At step 440, an invalidate command is issued to the I/O bus 116, and the method proceeds to step 442 where the matching entry is removed from the corresponding directory 302 or 314. Thereafter, the method proceeds to end at step 422.

At step 444, it is determined whether or not the matching entry is modified in the corresponding directory 302 or 314. If, at step 444, it is determined that the matching entry is modified, then the method proceeds to step 446. If, however, at step 444, it is determined that the matching entry is not modified, then the method proceeds to step 454.

At step 454, a shared snoop response is returned to the system bus 112, and the method proceeds to end at step 422.

At step 446, a retry snoop response is returned, and the method proceeds to step 448. At step 448, a RWITM command is issued to the I/O bus 116, and the method proceeds to step 450. At step 450, after the RWITM command has been successfully executed and the data associated therewith returned, the returned data is written to memory 105. Thereafter, the method proceeds to step 452 where the matching entry is removed from the corresponding directory 302 or 314, and the method proceeds to end at step 422.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. In a data processing system having a processor a memory controller, and a bus unit controller having at least one I/O cache, the processor and memory controller being coupled to a system bus, and the memory controller and bus unit controller being coupled to the I/O bus, an apparatus for reducing the time required to snoop address requests for data residing in the at least one I/O cache, the apparatus comprising:

means for storing, in the memory controller, data related to address requests received from the I/O bus;

means for retrieving the stored data in response to detecting an address request from the system bus; and means for returning either a snoop response to the system bus or for changing the status of the addressed data in the at least one I/O cache.

2. The apparatus of claim 1 wherein the retrieving means includes:

means for comparing an address request detected on the system bus with the stored data to determine whether or not the data for the address is cached in the at least one I/O cache.

3. The apparatus of claim 2 wherein the storing means includes:

a data directory for storing general purpose read/write data stored in the at least one I/O cache; and a translation directory for storing address translation information stored in the at least one I/O cache.

4. The apparatus of claim 3 wherein the at least one cache can only store data in shared state, and the returning means includes:

means for returning a shared snoop response when the address request is the result of a read operation.

5. The apparatus of claim 4 wherein the returning means includes:

means for invalidating the stored data, corresponding to the requested address, in the at least one I/O cache in response to the address request either invalidating or modifying the stored data.

6. A data processing system comprising:

memory for storing data;

at least one processor for performing operations on the data;

a system bus, coupled to the at least one processor, for communication;

an Input/Output (I/O) bus for communication with I/O devices;

at least one I/O cache, coupled to the I/O bus, for storing frequently accessed data;

a memory controller, coupled to the system bus and the I/O bus, for controlling access to memory, the memory controller including:

means for storing data related to address requests received from the I/O bus;

means for retrieving the stored data in response to detecting an address request from the system bus; and means for returning either a snoop response to the system bus or for changing the status of the addressed data in the at least one I/O cache.

7. The data processing system of claim 6 wherein the retrieving means includes:

means for comparing an address request detected on the system bus with the stored data to determine whether or not the data for the address is cached in the at least one I/O cache.

8. The data processing system of claim 7 wherein the storing means includes:

a data directory for storing general purpose read/write data stored in the at least one I/O cache; and a translation directory for storing address translation information stored in the at least one I/O cache.

9. The data processing system of claim 8 wherein the at least one cache can only store data in shared state, and the returning means includes:

means for returning a shared snoop response when the address request is the result of a read operation.

10. The data processing system of claim 9 wherein the returning means includes:

means for invalidating the stored data, corresponding to the requested address, in the at least one cache in response to the address request either invalidating or modifying the stored data.

11. In a data processing system having a processor, a memory controller, and a bus unit controller having at least one I/O cache, the processor and memory controller being coupled to a system bus, and the memory controller and bus unit controller being coupled to the I/O bus, an apparatus a method of for reducing the time required to snoop address requests for data residing in the at least one I/O cache, the apparatus the method comprising:

storing, in the memory controller, data related to address requests received from the I/O bus;

retrieving the stored data in response to detecting an address request from the system bus; and returning either a snoop response to the system bus or for changing the status of the addressed data in the at least one I/O cache.

12. The method of claim 11 wherein the step of retrieving includes the step of:

comparing an address request detected on the system bus with the stored data to determine whether or not the data for the address is cached in the at least one I/O cache.

13. The method of claim 12 wherein the step of storing includes the steps of:

storing general purpose read/write data, stored in the at least one I/O cache, in a data directory; and storing address translation information, stored in the at least one I/O cache, in a translation directory.

14. The method of claim 13 wherein the at least one cache can only store data in shared state, and the step of returning includes the step of:

returning a shared snoop response when the address request is the result of a read operation.

15. The method of claim 14 wherein the step of returning includes the step of:

invalidating the stored data corresponding to the requested address, in the at least one cache in response to the address request either invalidating or modifying the matching data.

* * * * *